United States Patent
Schreiber et al.

(10) Patent No.: US 10,267,404 B2
(45) Date of Patent: Apr. 23, 2019

(54) GEARING

(71) Applicant: WITTENSTEIN AG, Igersheim (DE)

(72) Inventors: Heiko Schreiber, Gnaschwitz (DE); Michael Schmidt, Reichenberg (DE)

(73) Assignee: Wittenstein SE, Igersheim (DE)

( * ) Notice: Subject to any disclaimer, the term of this patent is extended or adjusted under 35 U.S.C. 154(b) by 429 days.

(21) Appl. No.: 15/093,313

(22) Filed: Apr. 7, 2016

(65) Prior Publication Data
US 2016/0298748 A1 Oct. 13, 2016

(30) Foreign Application Priority Data
Apr. 10, 2015 (DE) .......................... 10 2015 105 523

(51) Int. Cl.
F16H 49/00 (2006.01)

(52) U.S. Cl.
CPC ..... F16H 49/001 (2013.01); *F16H 2049/003* (2013.01)

(58) Field of Classification Search
CPC .......................... F16H 49/001; F16H 2049/003
See application file for complete search history.

(56) References Cited

U.S. PATENT DOCUMENTS

| | | | |
|---|---|---|---|
| 7,086,309 B2 * | 8/2006 | Stoianovici | F03C 1/04 74/640 |
| 8,256,327 B2 | 9/2012 | Schreiber | |
| 8,307,738 B2 | 11/2012 | Schmidt et al. | |
| 8,656,809 B2 * | 2/2014 | Bayer | F16H 25/06 475/164 |
| 9,228,651 B2 * | 1/2016 | Waide | F16H 49/001 |
| 9,394,984 B2 * | 7/2016 | Balsiger | F16H 49/001 |
| 9,416,861 B2 * | 8/2016 | Ishikawa | F16H 49/001 |
| 9,470,301 B2 * | 10/2016 | Kuo | F16H 49/001 |
| 2010/0024593 A1 | 2/2010 | Schmidt et al. | |
| 2010/0077882 A1 | 4/2010 | Schreiber | |

FOREIGN PATENT DOCUMENTS

| | | |
|---|---|---|
| DE | 2617951 B2 | 6/1978 |
| DE | 102007011175 A1 | 9/2008 |
| DE | 102007016189 A1 | 10/2008 |
| DE | 102007019607 A1 | 10/2008 |
| GB | 258809 A | 9/1926 |

\* cited by examiner

*Primary Examiner* — David M Fenstermacher
(74) *Attorney, Agent, or Firm* — Bachman & LaPointe, PC

(57) ABSTRACT

Gearing (1), in particular coaxial gearing or linear gearing, having a toothing (5), a tooth carrier (11) in which there is received a multiplicity of teeth (7) for engagement with the toothing, wherein the teeth (7) are mounted so as to be radially displaceable relative to the tooth carrier (11), a cam disk (20) for the radial drive of the radially displaceably mounted teeth (7), wherein the cam disk (20) has two encircling rims, between which there is arranged a raceway, rolling bodies (23) which are arranged on the running surface between the rims, and a multiplicity of pivot segments (24) which are arranged in encircling fashion on the rolling bearing bodies and which lie in each case by way of a rolling bearing surface against the rolling bodies (23), wherein, on both sides of the rolling bearing surface, there is arranged in each case one rim bearing surface, wherein the two rim bearing surfaces lie at least partially against the rims.

10 Claims, 3 Drawing Sheets

GEARING

BACKGROUND OF THE INVENTION

The invention relates to a gearing and to a method for operating a gearing.

From the prior art, gearings are known which comprise teeth which are mounted in radially displaceable fashion in a tooth carrier. Drive input elements with a profiling, such as for example cam disks, are used for driving the teeth. The teeth engage into a toothing such that a relative movement between the tooth carrier with the teeth and the toothing occurs. The relative movement between toothing and teeth is in this case smaller, by at least an order of magnitude, than the movement of the drive input element with the profiling. In this way, it is possible to realize high transmission ratios; an example of a gearing of said type is published in DE 10 2007 011 175 A1.

A critical point of said gearing is the mounting of the teeth on the cam disk. It is known for rolling bearings to be used in combination with pivot segments which are mounted on the rolling bearings and which bear the teeth or support them in a radial direction and force them in the direction of the toothing if an elevation of the cam disk drives the rolling bearings and pivot segments in a radial direction. Here, the pivot segments are subject to considerable loads, wherein friction-induced heat is also generated. Such losses are undesirable.

It is an object of the invention to specify gearings which are improved in relation to gearings known from the prior art, wherein it is sought to achieve reduced generation of heat or reduced losses. It is also an object of the invention to specify a method for operating a gearing of said type.

SUMMARY OF THE INVENTION

The object is achieved by way of a gearing and a method for operating a gearing according to the present invention described hereinbelow.

One aspect of the invention relates to a gearing, in particular a coaxial gearing or linear gearing, having a toothing, a tooth carrier in which there is received a multiplicity of teeth for engagement with the toothing, wherein the teeth are mounted so as to be radially displaceable relative to the tooth carrier, a cam disk for the radial drive of the radially displaceably mounted teeth, wherein the cam disk has two encircling rims, between which there is arranged a raceway, rolling bodies which are arranged on the running surface between the rims, and a multiplicity of pivot segments which are arranged in encircling fashion on the rolling bearing bodies and which lie in each case by way of a rolling bearing surface against the rolling bodies, wherein, on both sides of the rolling bearing surface, there is arranged in each case one rim bearing surface, wherein the two rim bearing surfaces lie at least partially against the rims.

A further aspect of the invention relates to the use of a gearing with typical features described herein.

A further aspect relates to a pivot segment in one of the typical embodiments described herein.

Embodiments of the invention relate in particular to coaxial gearings. Gearings of the invention typically comprise an internally situated cam disk with a profiling as drive input element, and an internal gear with an internally situated toothing, or an externally situated drive input element with an internal profiling and an internally situated gearwheel or an internally situated toothed rack which, in the case of the externally situated drive input element, constitutes the toothing. Configurations of embodiments relate to linear gearings for the conversion of a rotation into a linear movement.

The toothing is typically an encircling toothing. The toothing is engaged into by the teeth or the tooth tips of the teeth, wherein the teeth are typically mounted so as to be linearly radially displaceable relative to the tooth carrier. Here, "linearly radially" means, in the conventional sense, that a guide in a radial direction is provided, which guide permits only a movement of the tooth in the radial direction. Typically, by way of the guide, the tooth segment can be displaced linearly in precisely one direction; this may be achieved for example by virtue of the fact that the tooth has a uniform cross section over a particular length in the displacement direction, wherein the tooth carrier likewise has an opening for the tooth segment with a uniform cross section. The teeth are normally mounted in the tooth carrier so as to be displaceable in each case in precisely one direction, typically in the direction of the longitudinal axis of the tooth. Furthermore, in typical embodiments, the rotational degree of freedom of the teeth relative to the tooth carrier about the longitudinal axis of the gearing is blocked. This may be achieved for example by way of a linear guide of the teeth in a radial direction in the tooth carrier. In this way, the teeth rotate with the tooth carrier about the longitudinal axis of the gearing, but not relative to the tooth carrier.

In typical embodiments of the gearing according to the invention, at least a part of the teeth is of flexurally rigid design. Here, the expression "flexurally rigid" is typically to be understood in the technical sense, that is to say bending of the teeth is, owing to the rigidity of the material of the teeth, so slight as to be at least substantially insignificant with regard to the kinematics of the gearing. Flexurally rigid teeth comprise, in particular, teeth which are produced from a metal alloy, in particular steel or a titanium alloy, a nickel alloy or other alloys. Furthermore, it is also possible for flexurally rigid teeth composed of plastic to be provided, in particular in the case of gearings in which at least one of the following parts is likewise produced from plastic: a toothing on an internal gear or on a gearwheel, tooth carrier and drive input element. In typical embodiments of the invention, the tooth carrier and the teeth are produced from a metal alloy, or additionally the toothing, or further additionally the drive input element, are produced from a metal alloy. Such gearings have the advantage of being extremely resistant to torsion and having an extremely high load capacity. Gearings composed of plastic have the advantage of having a low weight. The expression "flexurally rigid" refers in particular to flexural rigidity about a transverse axis of the tooth segment. This means in particular that, considering the tooth segment as a beam from a tooth root to a tooth tip, flexural rigidity exists which at least substantially prevents bending deformations between tooth tip and tooth root. Owing to the flexural rigidity, an extremely high load capacity and resistance to torsion of the gearing is achieved.

In typical embodiments, there is arranged between the tooth and the profiling a pivot segment, which is mounted on a rolling bearing arrangement which in turn lies against the profiling. Advantageous embodiments comprise a pivot segment which is arranged between the drive input element with the profiling and in each case at least one tooth. The pivot segment allows the tooth to tilt relative to the profiling or relative to the pivot segment. It is typical for at least two teeth to be mounted on a pivot segment. Multiple teeth mounted on one pivot segment are typically arranged adjacent to one another in a row in an axial direction.

Typically, the tooth segment is loosely connected to the pivot segment. Here, a "loose connection" preferably means that the tooth segment is merely placed onto the pivot segment, normally placed thereon directly. Preferred pivot segments comprise a profile which prevents the tooth from slipping off the pivot segment, or prevents slippage of the pivot segment at least in one direction. It should be taken into consideration that the pivot segments are, in this way, held in their position in the rotational direction relative to the tooth carrier by the radially and linearly guided teeth. Such a profile may for example be a bead which engages into a depression. It is ensured in this way that the tooth segment does not slide over the pivot segment. It is achieved in this way that the pivot segment is fixed on the position of the tooth and a relative movement in a circumferential direction between tooth segment and pivot segment is prevented. Here, the profile is preferably arranged such that displaceability in a circumferential direction is blocked, such that slipping-off in a circumferential direction is prevented. In further embodiments, it is however also possible for spherical-cap-shaped, spherical or other elevations to be provided which prevent slippage of the pivot segments relative to the teeth.

Typical pivot segments make it possible to realize a segmented bearing arrangement. In typical embodiments, the pivot segments or other bearing segments, such as plates, form a segmented bearing arrangement. The segmented bearing arrangement offers the advantage that it can adapt to the profiling of the drive input element and, furthermore, permits reliable force transmission in a radial direction.

The pivot segments preferably have edges, facing toward one another, with elevations and depressions, for example an undulating form or a serrated form. This offers the advantage that needle rollers which are arranged under the pivot segments are reliably held in the space between the pivot segments and the drive input element even in the case of a relatively large spacing between the pivot segments.

The loose connection between the tooth segment and the pivot segment offers the advantage of simple construction. Here, a "loose connection" means in particular that the teeth are not prevented from lifting off from the pivot segments. A lift-off of the teeth from the pivot segments is, in the case of generic gearings, generally prevented by virtue of the fact that the teeth are guided at the tooth tips by the toothing.

Typical embodiments of the invention comprise a drive input element with a profiling. The profiling preferably has a non-circular or non-ellipsoidal arcuate shape or curve. The non-circular or non-ellipsoidal arcuate shape offers the advantage that any desired profilings can be used, for example in order to set different transmission ratios. In the context of this application, eccentrics likewise fall under the definition of circular or ellipsoidal shapes, because in the case of eccentrics, it is merely the case that the axis of rotation does not correspond to the central axis of the circular shape, despite a circular shape nevertheless being present. In typical embodiments, the tooth carrier or the toothing is of circular form. This offers the advantage of a simple geometry for the tooth carrier and for the toothing. It is typically the case that the transmission of force on the slow side of the gearing takes place between the toothing and the tooth carrier. This offers the advantage that the travel for the force transmission is extremely short, such that extremely high rigidity can be achieved. Embodiments which satisfy said conditions include, but are not limited to: a gearing with internally situated cam disk as drive input and externally situated internal gear with toothing, wherein the tooth carrier is arranged between internal gear and cam disk; an externally situated cam disk with internally situated profiling on an internal gear for the drive of the radially movable teeth inward against a toothing, which is arranged on a toothed wheel or a toothed rack.

The toothing and the teeth typically have curved flanks. Examples of curvatures of the flanks are a cylindrical curvature or a curvature in the form of a logarithmic spiral. For a possible embodiment of a curvature in the form of a logarithmic spiral, reference is made to DE 10 2007 011 175 A1. The curved surface offers the advantage that the flanks that are in engagement make areal contact and not merely linear or punctiform contact. In this way, extremely high rigidity is realized in the transmission of force between the toothing and the teeth.

In typical embodiments, the cam disk for the radial drive of the radially displaceably mounted teeth comprises two encircling rims, between which a raceway is arranged. In this way, the rolling bodies arranged between the rims are guided in secure fashion. Typical embodiments comprise a multiplicity of pivot segments which are arranged or mounted in encircling fashion on the rolling bearing bodies and which lie in each case by way of a rolling bearing surface against the rolling bodies, wherein, on both sides of the rolling bearing surface, there is arranged in each case one rim bearing surface, wherein the two rim bearing surfaces of in each case one pivot segment lie at least partially against the rims. In this way, reliable guidance of the pivot segments is realized. The rim bearing surfaces and rolling bearing surfaces are typically arranged adjacent to one another on the same side of a pivot segment, normally on that side which is situated opposite a tooth bearing side, that is to say the side on which the teeth are mounted.

Typically, the pivot segments each comprise a segment edge which is at the front in the direction of rotation and a segment edge which is at the rear in the direction of rotation, wherein the segment edges each comprise projections which are formed in the direction of rotation and which protrude in relation to a central strip of the pivot segment. In this way, it is possible for the projections to lie against a rolling body already before a central strip of the pivot segment lies fully against the rolling body. This increases the running smoothness of the pivot segments.

In typical embodiments, the projections of the two segment edges of each pivot segment, or of in each case one pivot segment, run parallel. If two or more such pivot segments are arranged one behind the other in the direction of rotation, it is possible for the projections to engage into one another. In this way, it is possible for the rolling bodies to be permanently subjected to load, even if spacings are provided in each case between the pivot segments. Spacings between the pivot segments are provided in typical embodiments of gearings in order to provide the pivot segments with freedom of movement in the direction of rotation. Such spacings may be necessary in order to compensate the fact that the spacing of the tooth carrier relative to the rolling bearing surface varies over the course of one revolution.

Typically, the protrusion of the projections in the region of the rim bearing surfaces corresponds to at least 20%, typically at least 35% or at least 50%, of the width of the central strip in the direction of rotation. Here, "central strip" refers to that region of the pivot segment which, over the width of the pivot segment perpendicular to the direction of rotation, has no recesses. Recesses refer to regions between projections. In the region of the central strip, it is for example possible for a tooth bearing to be arranged on the tooth-facing side of the pivot segment. Typical tooth bearings of embodiments comprise tooth bearing surfaces which comprise a rounded surface section for in each case one tooth, typically for at most two teeth, in order to realize an axis of rotation for a rotation of the tooth relative to the pivot segment. In typical embodiments, the tooth bearing surfaces are designed such that the axis of rotation at least substantially coincides with the rolling bearing surface. Here, "substantially" means for example that the axis of rotation lies above or below the rolling bearing surface by most 50% or at most 30% or at most 20% or at most 10% of the diameter of a rolling body. In this way, a forward and backward displacement of the pivot segment in addition to the rotational movement is prevented. Such displacements may arise if the axis of rotation is situated far remote from the rolling bearing surface. With the described measures, it is also possible for the displacement of the pivot segments relative to one another in the direction of rotation to be limited, such that the spacings between the pivot segments can be reduced. This can increase the running smoothness of the rolling bodies.

In typical gearings, the protrusion of the projections in the region of the rim bearing surfaces amounts to at least 30%, at least 50%, at least 75% or at least 80% of the protrusion of the projections in the region of the rolling bearing surface, typically in both directions of rotation at both rim bearing surfaces. In this way, the running smoothness of the pivot segments is increased because the support surface on the rims is enlarged. By way of a large protrusion, a large lever arm is realized, which can minimize tilting of the pivot segments. Typically, the protrusion of the projections is equal in the region of each of the rim bearing surfaces; in each case in both directions of rotation at each rim bearing surface and/or on both rim bearing surfaces. Symmetrical support is realized in this way.

Typically, the projections protrude, in the region of the rim bearing surfaces of in each case one pivot segment, in both directions of rotation in relation to the central strip. In this way, it is possible to avoid non-uniform support against tilting. In typical gearings, in the region of each of the two rim bearing surfaces of a pivot segment, projections are provided on both sides of the central strip. This can assist in avoiding non-uniform support in different directions of rotation.

Typically, the projections are, in the region of in each case one rim bearing surface, not formed over the entire width of the rim bearing surface. Here, the width is the width perpendicular to the direction of rotation, that is to say transversely with respect to the pivot segment and with respect to the direction of the rim. Typically, a step is provided in the segment edge in the region of the rim bearing surface. In this way, it is possible for projections to be provided which protrude to a great extent in the region of the rim bearing surfaces, for example by at least 80% of the greatest protrusions of projections.

Typically, in each case one run-in region, in particular a bevel or a rounded set-back portion, is provided on the projections on the side or in the region of the rolling bearing surface. In this way, the running smoothness can be increased, because the rolling bodies can run in under the pivot segment easily.

In typical embodiments, at least in each case two projections are provided on both segment edges in the region of the rolling bearing surface. The in each case at least two projections per segment edge in the region of the rolling bearing surface typically have the same protrusion length. In typical embodiments, the in each case at least two projections per segment edge are equipped with a run-in region, in particular in each case at the tip of the projections. With these measures, the run-in behavior of the rolling bodies, or of the needle rollers, under the pivot segments can be improved. In embodiments, jamming of the rolling bodies is prevented by way of such measures.

Typical projections may also extend both over the rolling bearing surface and over the rim bearing surface. Accordingly, a projection may be designed to be of such a width as to be situated both in the region of the rolling bearing surface and in the region of the rim bearing surface. This can simplify the geometry.

BRIEF DESCRIPTION OF THE DRAWINGS

Below, the invention will be discussed in more detail on the basis of the appended drawings, wherein, in the Figures.

DETAILED DESCRIPTION

Below, typical embodiments of the invention will be described on the basis of the Figures, wherein the invention is not restricted to the exemplary embodiments; the scope of the invention is rather defined by the claims. In the description of the embodiment, in some cases, the same reference designations have been used for identical or similar parts in different Figures and for different embodiments in order to make the description clearer. This however does not mean that corresponding parts of the invention are restricted to the variants illustrated in the embodiments.

Figure 1:
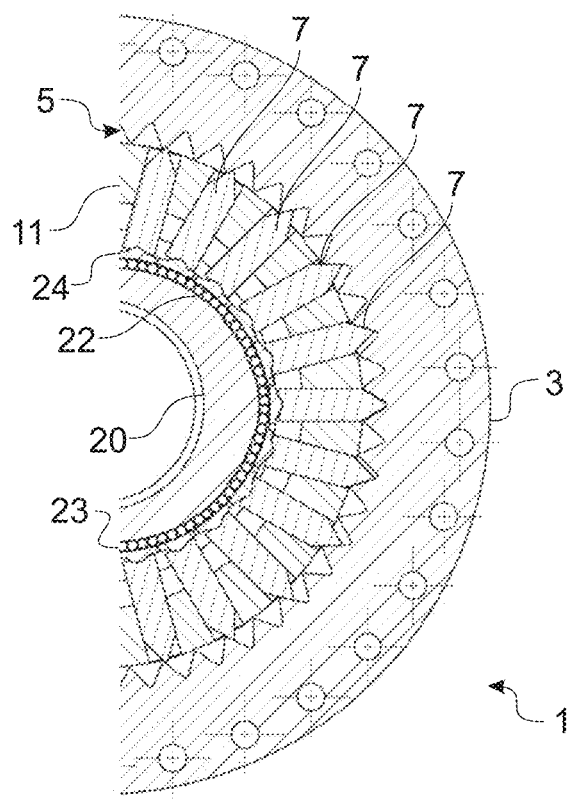
FIG. 1 schematically shows an embodiment of the invention in a halved schematic sectional view.

FIG. 1 shows an exemplary embodiment in a schematic halved sectional view. FIG. 1 schematically shows, in a halved section, a gearing 1 which has an internal gear 3 with an internally situated encircling toothing 5. A second half of the gearing 1 is, in section, of analogous construction to the section illustrated. Teeth 7 engage into the toothing 5. For better clarity, not every tooth 7 in FIG. 1 is denoted by the reference designation 7. Typically, two axially parallel toothed rings with individual teeth 7 are provided. The teeth 7 are mounted in radially displaceable fashion in a tooth carrier 11. For this purpose, the tooth carrier 11 has radially oriented, duct-like circular or slot-shaped openings which ensure radial guidance of the teeth 7 in the tooth carrier 11. Owing to the radial guidance in the openings, the teeth 7 are capable of moving only in a radial direction along their longitudinal axis; in particular, a rotation relative to the tooth carrier 11 about a longitudinal axis of the gearing 1 is prevented.

The longitudinal axis of the teeth typically refers to the axis running from the tooth root to the tooth tip, whereas the longitudinal axis of the gearing points in the direction of the axis of rotation of the gearing. This may for example be the axis of rotation of the tooth carrier that can be used as drive output, or else the axis of rotation of a cam disk.

The teeth 7 are driven by a cam disk 20 which is designed as a hollow cam disk 20. The cam disk 20 has a profiling 22 for driving the teeth 7 in the radial direction. A course of the profiling 22 has two elevations over the circumference, such that respectively oppositely situated teeth 7 are engaged into tooth spaces of the toothing 5 to the furthest extent.

In the gearing 1 illustrated in FIG. 1, the teeth 7 are arranged, with a rolling bearing, on the profiling of the drive input element. The rolling bearing comprises rolling bodies 23 which, in this exemplary embodiment, are in the form of needle rollers.

In the exemplary embodiment of FIG. 1, the cam disk is arranged at the inside, and the toothing is arranged at the outside. In such a configuration, the drive output action is picked off at the internal gear with the toothing or at the tooth carrier, wherein the respective other element is fixed. In further embodiments, the drive input element is arranged at the outside, that is to say outside the tooth carrier, and the toothing is arranged at the inside. It is in turn possible for the drive output action to be picked off at the inner toothing or at the tooth carrier. The tooth carrier may also be referred to, with its openings, as tooth cage, in which teeth are received so as to be guided in radially linearly displaceable fashion.

The gearing 1 comprises a segmented bearing arrangement for the teeth 7. The segmented bearing arrangement comprises pivot segments 24 which each have, on the side facing toward the tooth 7, a rounded tooth bearing surface (see FIG. 2) which forms a bead on which the root of a tooth 7 or, in typical embodiments, 2, 3 or 4 teeth adjacent to one another in an axial direction of the gearing 1, may be arranged. The bead, together with a corresponding recess in the tooth root of the respective tooth 7, prevents slippage of the tooth 7 on the pivot segment 24.

The beads serve in each case to form root joints for the teeth 7, such that the teeth 7 can tilt relative to the pivot segments 24 in order to ensure unconstrained guidance. The pivot segments 24 are displaceable relative to one another in a direction of rotation, such that the spacings between the pivot segments 24 can be varied. In this way, the degree of freedom in the direction of rotation of the pivot segments 24 is also not blocked. This permits substantially unconstrained guidance and substantially unconstrained radial drive of the pivot segments 24 by the profiling 22 of the cam disk 20. To minimize the friction resistance between the profiling 22 and the pivot segments 24, the rolling bodies 23 are provided as needle rollers. In further embodiments, balls or other rolling bearings are provided for the mounting of pivot segments.

Figure 2:
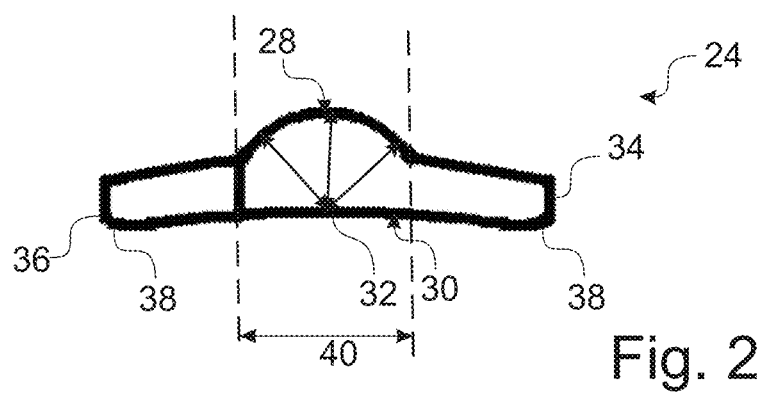
FIG. 2 shows a pivot segment of the embodiment of FIG. 1 in a schematic side view.
Figure 3:
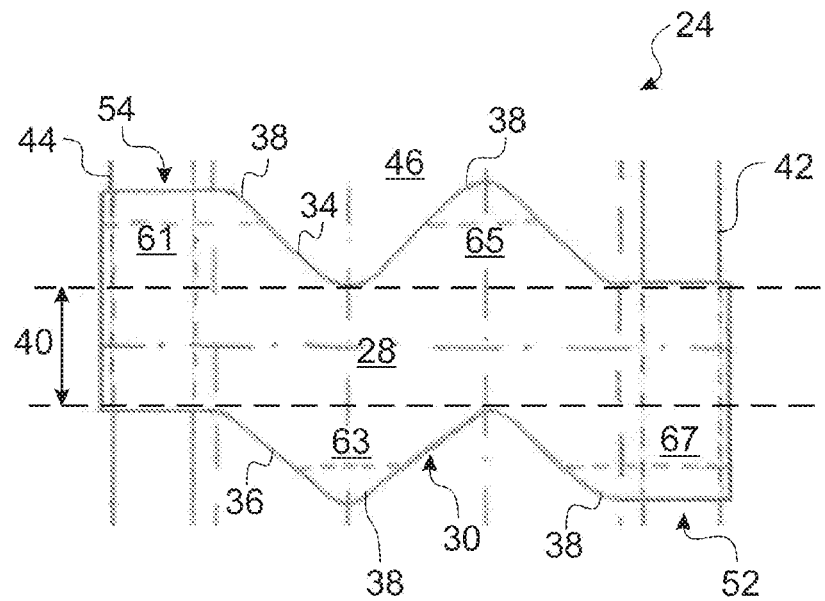
FIG. 3 shows the pivot segment of FIG. 2 of the embodiment of FIG. 1 in a schematic plan view.

FIGS. 1, 2 and 3 will be described together, wherein not all of the details will be discussed again, and reference designations are used identically for the same parts.

FIG. 2 illustrates a pivot segment 24 of the gearing 1 of FIG. 1. The pivot segment 24 comprises a tooth bearing on that side of the pivot segment 24 which, in the gearing 1, faces toward a tooth 7. The tooth bearing of the pivot segment 24 comprises a tooth bearing surface 28 which comprises a rounded surface section for in each case at least one tooth 7. The rounded surface section of the tooth bearing surface 28 is in this case of circular form. The central point of the circle coincides with a rolling bearing surface 30 of the pivot segment 24. In this way, for the teeth 7 which are mounted on the pivot segments 24, a respective axis of rotation 32 is realized which coincides with the rolling bearing surface 30. The rolling bearing surface 30 is in this case that side of the pivot segment 24 which is averted from the tooth, that is to say the side which faces toward the rolling body 23 or toward the cam disk 20. The rolling bearing surface 30 corresponds to the surface on which the rolling bodies 23 roll.

The pivot segment 24 comprises a segment edge 34 which is at the front in the direction of rotation and a segment edge 36 which is at the rear in the direction of rotation. Here, the expressions "front" and "rear" are not meant in the sense of a movement; rather, they refer to two opposite sides of the pivot segment 24. Typical gearings can be operated in two directions, such that, during operation, it is also possible for the front segment edge to be situated at the rear in the direction of movement during rotation, and accordingly for the rear segment edge to be situated at the front.

Rounded set-back portions or bevels 38 are provided in each case at the transition from the rolling bearing surface 30 to the front segment edge 34 and to the rear segment edge 36. Said set-back portions or bevels facilitate a run-in of the rolling bodies 23 and can thus increase the running smoothness of the respective pivot segments 24.

In further embodiments, in the region of the segment edges, rounded transitions are provided between the rolling bearing surface and the side surface of the segment edge. Said rounded transitions may also be referred to as rounded set-back portions. Typically, bevels or rounded set-back portions are provided at least, or only, in the region of the projections.

In typical embodiments, the pivot segment is formed without an axial guide. Since the rims perform the guidance of the needle rollers, axial guidance on the pivot segment is not imperatively necessary. In typical embodiments, the projections are designed with point symmetry. Further embodiments are designed with axially symmetrically arranged projections.

The pivot segment 24 of FIG. 2 has a central strip 40 which is situated between two dashed lines in FIG. 2. Said central strip 40 is situated under the tooth bearing surface 28. In front of and behind the central strip 40 in the direction of rotation, there are situated respective projections which will be discussed in more detail in conjunction with FIG. 3 and, in conjunction with other embodiments, also FIGS. 4 and 5.

FIG. 3 shows a plan view of the pivot segment 24 of the embodiment of FIG. 2, wherein details of the gearing 1 are additionally also shown. FIG. 3 will be described in conjunction with FIGS. 1 and 2, because the same parts are illustrated in each case, although FIG. 3 also shows details not shown in FIG. 1 and in FIG. 2.

The schematic view of FIG. 3 is a plan view of the pivot segment 24 from above, that is to say from the side of the tooth bearing surface 28. The pivot segment 24 lies against a right-hand rim 42 and a left-hand rim 44, which are part of the cam disk. The rims 42 and 44 delimit a raceway 46 situated in between. For clarity, the rolling bodies are not illustrated in FIG. 3, FIG. 4 or FIG. 5. The rolling bodies, which in the exemplary embodiment are in the form of needle rollers, are situated between the two rims 42 and 44 and run on the raceway 46.

The rims 42 and 44 are formed so as to be tall enough in relation to the running surface 46 that they reach approximately the same height as the rolling bodies or reach only a slightly lower height, that is to say for example a height reduced at least by 0.1% and/or up to 1%, up to 5% or up to 10% of the rolling body diameter.

In the view of FIG. 3, the rolling bearing surface 30 is situated under the pivot segment 24 and in each case between the rims 42 and 44. Those surfaces of the pivot segment 24 which face toward the rims 42 and 44, and which are arranged in the region of the rims 42 and 44 situated therebelow, are referred to as rim bearing surfaces 52 and 54, wherein in each case one of the surfaces 52 and 54 lies over each of the rims 42 and 44. The rim bearing surfaces 52 and 54 lie in each case at least partially on the rims 42 and 44 and thus increase the running smoothness of the pivot segment 24.

The pivot segment 24 has a central strip 40 which is depicted by dashed lines. Projections 61, 63, 65 and 67 protrude in relation to said central strip 40, in the region of which the tooth bearing surface 28 is also situated. The central projections 63 and 65 are situated entirely in the region of the rolling bearing surface 30 and, at their ends, each have rounded set-back portions or bevels 38 which make it easier for the rolling bodies to run in under the pivot segment 24.

The lateral projections 61 and 67 are situated at least partially in the region of the rim bearing surfaces 52 and 54. The lateral projections 61 and 67 are therefore suitable for preventing tilting of the pivot segment 24 by way of support on one of the rims 42 or 44.

The lateral rims 61 and 67 of the exemplary embodiment of FIG. 3 protrude in different directions in relation to the direction of rotation of the pivot segment 24. Tilting in both directions is thus prevented in an effective manner.

The length or size of the protrusion of the lateral projections 61 and 67 in the region of the rim bearing surfaces is equal to the length or size of the protrusion of the central projections 63 and 65. Stable guidance is ensured in this way.

Figure 4:
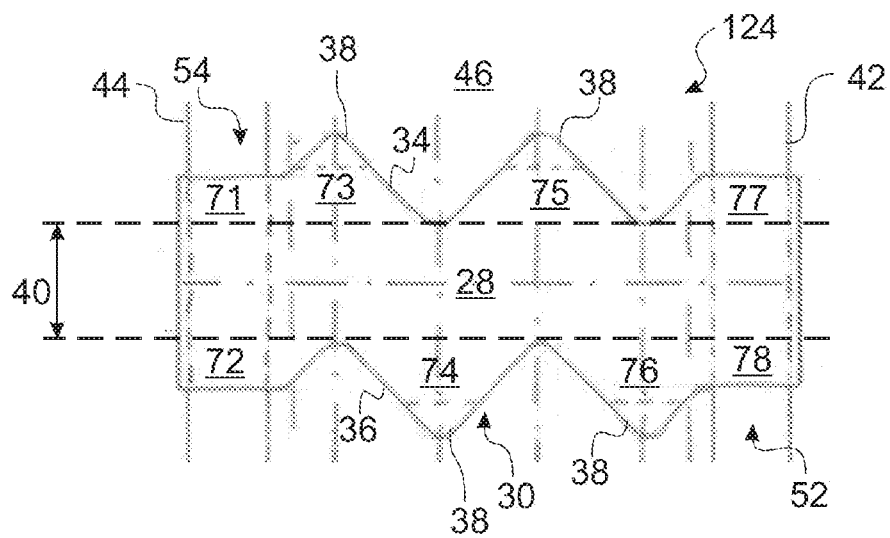
FIG. 4 shows a further embodiment of a pivot segment in a schematic plan view.
Figure 5:
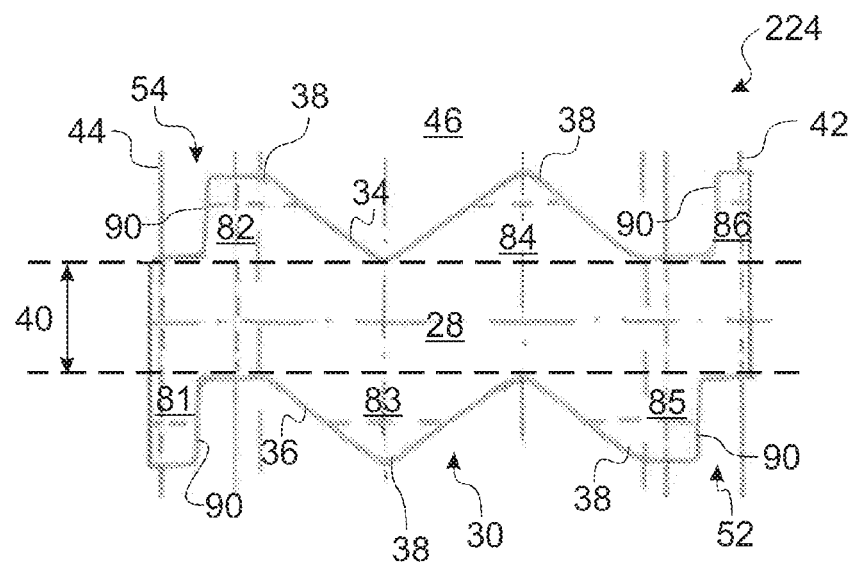
FIG. 5 shows a further embodiment of a pivot segment in a schematic plan view.
Figure 6:
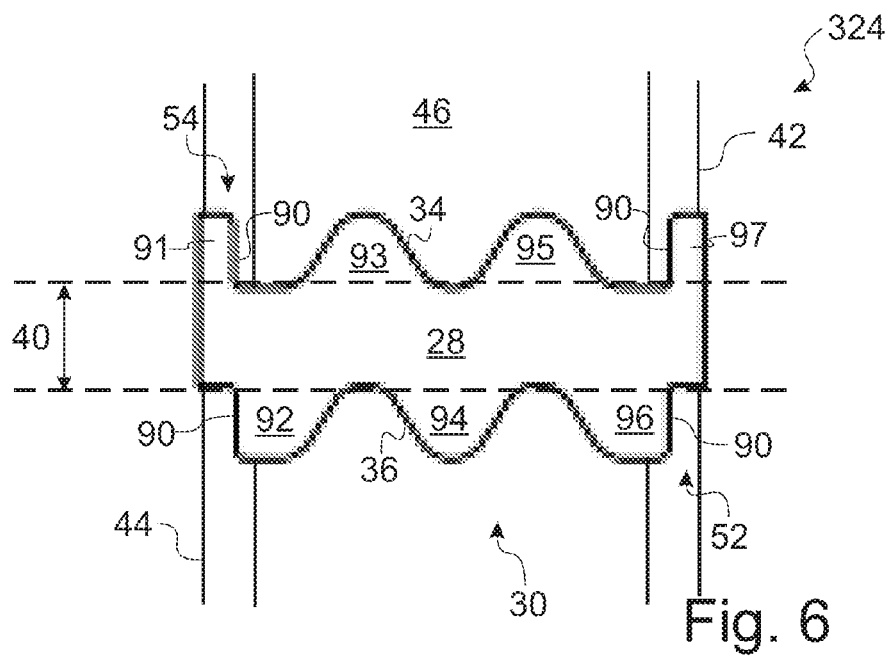
FIG. 6 shows a further embodiment of a pivot segment in a schematic plan view.

FIGS. 4 to 6 show further embodiments of pivot segments that can be used with the gearing of FIG. 1. Said pivot segments have, in part, similar or identical features, for which, in part, the same reference designations have been used, even though the other features partially differ. For example, the reference designations 34 and 36 have been used throughout for the segment edges, even though the shape of the segment edge differs in each case in the exemplary embodiments of FIGS. 3 to 6. Also, not all of the features or reference designations will be discussed again with regard to each of the Figures.

FIG. 4 shows a further embodiment of a pivot segment 124 which can for example also be used in the gearing of FIG. 1. As in the case of the pivot segment of FIG. 3, there is a front segment edge 34 and a rear segment edge 36. The segment edges 34 and 36 run parallel. In this way, the pivot segments 124, and also other pivot segments of exemplary embodiments, can in each case be used one behind the other with only a small spacing in the direction of rotation.

In typical embodiments, the overlapping regions of the projections overlap the rolling bodies, such that a rolling body is always overlapped by a pivot segment. This increases the running smoothness and the reliability of the gearing.

In the exemplary embodiment of FIG. 4, a considerable difference in relation to the exemplary embodiment of FIG. 3 consists in that the projections are of different design. The exemplary embodiment of FIG. 4 comprises projections 71 to 78, wherein the projections 73 to 76 are situated centrally over the raceway 46 of the rolling bodies, that is to say are provided in the region of the rolling bearing surface 30. On each of the central projections 73 to 76, there are again provided bevels 38 or rounded set-back portions in order, in each case, to make it easier for the rolling bodies to run in under the pivot segments 124.

In the region of the rim bearing surfaces 52 and 54, in each case two projections 71, 72 and 77, 78 are provided on both sides. The projections 71, 72, 77 and 78 protrude in each case in both directions in relation to the directions of rotation of the pivot segment 124. In this way, support with respect to both tilting directions is realized on both sides by way of both rims 42 and 44.

FIG. 5 shows a further embodiment of a pivot segment 224, which has projections 81 to 86. Again, in each case two projections 81, 82 and 85, 86 are provided on both rim bearing surfaces 52 and 54. Here, the two projections 81 and 82 each protrude beyond the central strip 40 in the region of the rim bearing surface 54. The projections 81, 82, 85 and 86 are in each case not formed over the entire width of a rim 42 or 44 situated therebelow and are also accordingly not formed over the entire width of the respective rim bearing surface 52 or 54. Rather, in the exemplary embodiment of FIG. 5, the segment edges 34 and 36 each have a step 90 in the region of the rim bearing surfaces 52 and 54. It is thereby possible for the projections 81, 82, 85 and 86 to each protrude, in the region of the rim bearing surfaces 52 and 54, to the same extent as the central projections 83 and 84. This makes it possible to realize a particularly large lever arm and a particularly high degree of running smoothness.

FIG. 6 shows a further embodiment of a pivot segment 324 which is of axially symmetrical design with respect to a central axis in the direction of rotation. Again, the pivot segment 324 comprises projections 91 to 97, wherein again, steps 90 are provided in the region of the rim bearing surface 52 and 54. In this way, the projections 91, 92 and 96, 97 are narrower in the region of the rim bearing surfaces but can extend to the full protrusion length of the central projections 93 to 95.

The invention is not restricted to the embodiment described above; rather, the scope of the invention is defined by the appended claims.

The invention claimed is:

1. Gearing comprising
a toothing;
a tooth carrier in which there is received a multiplicity of teeth for engagement with the toothing, wherein the teeth are mounted so as to be radially displaceable relative to the tooth carrier;
a cam disk for the radial drive of the radially displaceably mounted teeth, wherein the cam disk has two encircling rims, between which there is arranged a raceway;
rolling bodies which are arranged on the running surface between the rims; and
a multiplicity of pivot segments which are arranged in encircling fashion on the rolling bearing bodies and which lie in each case by way of a rolling bearing surface against the rolling bodies, wherein, on both sides of the rolling bearing surface, there is arranged in each case one rim bearing surface, wherein the two rim bearing surfaces lie at least partially against the rims, wherein the pivot segments each have a segment edge which is at the front in a direction of rotation and a segment edge which is at the rear in the direction of rotation, wherein the segment edges each comprise projections which are formed in the direction of rotation and which protrude in relation to a central strip of the pivot segment.

2. Gearing according to claim 1, wherein the projections of the two segment edges of each pivot segment run parallel.

3. Gearing according to claim 1, wherein the protrusion of the projections, in the region of the rim bearing surfaces, corresponds to at least 20% of the width of the central strip in the direction of rotation.

4. Gearing according to claim 1, wherein the protrusion of the projections, in the region of the rim bearing surfaces, amounts to at least 30% of the protrusion of the projections in the region of the rolling bearing surface.

5. Gearing according to claim 1, wherein the projections protrude, in the region of the rim bearing surfaces of in each case one pivot segment, in both directions of rotation in relation to the central strip.

6. Gearing according to claim 1, wherein, in the region of each of the two rim bearing surfaces of a pivot segment, projections are provided on both sides of the central strip.

7. Gearing according to claim 1, wherein the projections are, in the region of in each case one rim bearing surface, not formed over the entire width of the rim bearing surface.

8. Gearing according to claim 1, wherein run-in regions, comprising a bevel and/or a rounded set-back portion, are provided in each case on the projections on the side of the rolling bearing surface and/or in the region of the rolling bearing surface.

9. Gearing according to claim 1, wherein at least in each case two projections are provided on both segment edges in the region of the rolling bearing surface.

10. Gearing according to claim 1, wherein the pivot segments each have tooth bearing surfaces which comprise a rounded surface section for in each case at least one tooth in order to realize an axis of rotation for a rotation of the tooth relative to the pivot segment, wherein the axis of rotation at least substantially coincides with the rolling bearing surface.

* * * * *